United States Patent [19]

Hsu

[11] Patent Number: 5,031,070
[45] Date of Patent: Jul. 9, 1991

[54] STRUCTURE OF COMPUTER HOUSING

[76] Inventor: Kai Hsu, 1st Fl., No. 42, Lane 103, Sec. 1, Hsin Sheng S. Road, Taipei, Taiwan

[21] Appl. No.: 533,349

[22] Filed: Jun. 5, 1990

[51] Int. Cl.[5] .............................................. H05K 5/02
[52] U.S. Cl. .................................... 361/380; 361/394; 361/399; 361/429; 220/690
[58] Field of Search ...................... 220/4.28, 682, 690; 361/356, 391, 415, 428, 380, 383, 384, 390, 394, 395, 429; 364/708; 312/265.1, 265.2, 265.5

[56] References Cited

U.S. PATENT DOCUMENTS 3,714,369  1/1973  Banten ............................ 361/356 X
4,703,396  10/1987  Fletcher ......................... 361/415 X Primary Examiner—Leo P. Picard
Assistant Examiner—Michael W. Phillips

[57] ABSTRACT

A computer housing, which comprises a hollow frame structure having two opposite rails at the top and a base board at the bottom, two side panels having each a plurality of T-shaped hooks projecting from its bottom edge respectively fastened in corresponding T-shaped holes on the base board and an U-shaped portion on its top edge, an upper cover mounted on the two rails of the frame structure with its two opposite channel edges respectively engaged with the U-shaped portions of the two side panels, and a front panel fixedly secured to the front surface of the frame structure by means of screws permitting the bevel front edge of the upper cover to be retained in an upper channel which is made on its top edge.

2 Claims, 5 Drawing Sheets

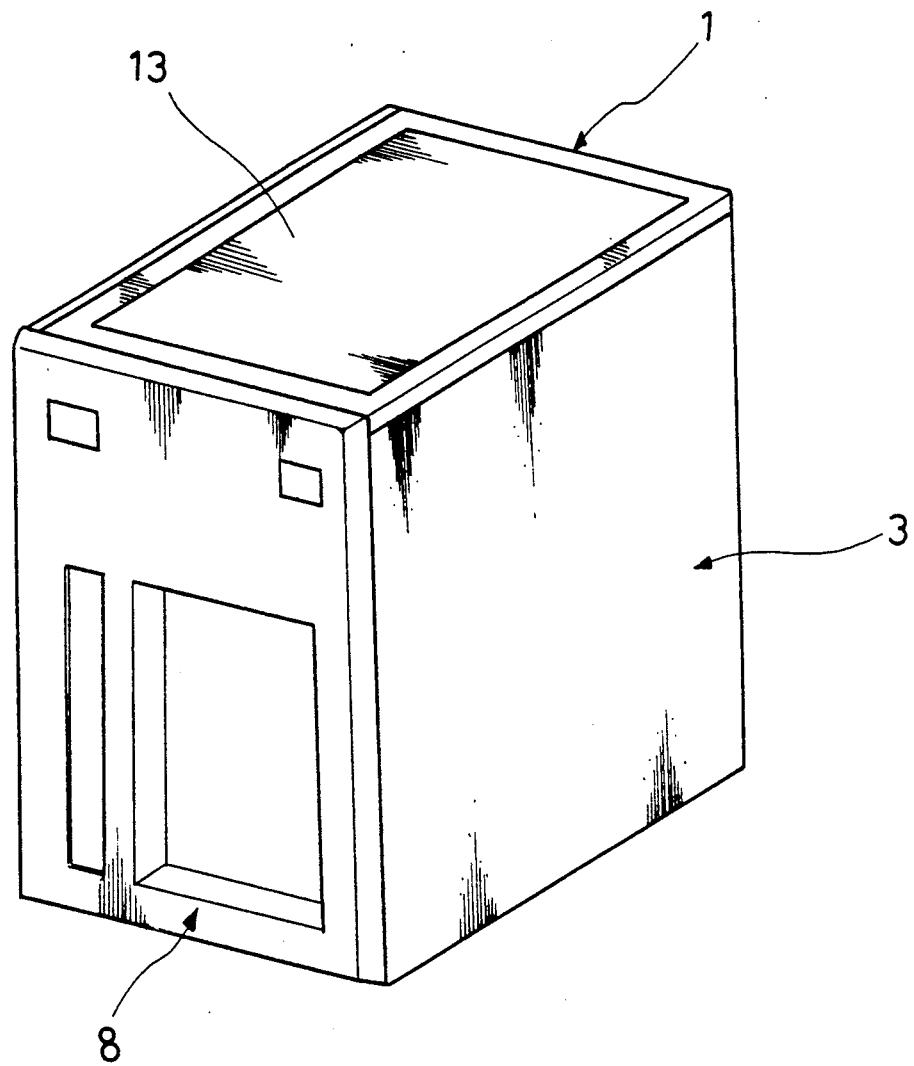
FIG·1

STRUCTURE OF COMPUTER HOUSING

BACKGROUND OF THE INVENTION

The present invention is related to computer housings and more particularly to a computer housing which is easily assembled by non-professional people.

Regular computers are generally comprised of a housing for mounting a computer mother board. According to the prior art, the computer housing is specifically designed according to the type of computer. Currently, there are several kinds of computer housings used for a variety of computers as outlined hereinafter.

1. For AT series, the computer housing is designed for mounting therein the AT mother board, a full-height hard disk drive and three floppy disk drives, and has provision for inserting 8 slot cards.

2. For XT series, the computer housing is similar to AT series. However, it is designed for mounting two floppy disk drives and no structural design is available for mounting a hard disk drive.

3. For baby AT series, the computer housing is for mounting 3 floppy disk drives and a small AT mother board.

4. For Mini Tower Case, it offers ⅔ of the functions of a Tower Case and is available for mounting a Baby AT, an XT or even an AT mother board which is equipped with 2×5¼" floppy disk drives and 2×3½" floppy disk drives.

5. For Slim Case (PS-2), it is available for mounting a Baby AT, an XT or a PS-2 mother board which is simultaneously equipped with 5¼" and 3½" floppy disk drives. In this design, slot cards are to be mounted horizontally by means of plug-in connection. Due to the horizontal insertion procedure, poor contact may happen frequently and the component parts of the mother board or the slot cards may be damaged easily. Further, this design is available only for mounting 3 slot cards.

6. For Tower Case, except PS-2, this design is suitable for mounting AT, Baby AT as well as XT mother boards and is available for mounting 6 floppy disk drives or 6 3½" floppy disk drives and 8 slot cards.

In the afore-mentioned types of computer housings, there are several common disadvantages as outlined hereinafter:

1. All of the housings are of enclosed type and have to be completely disassembled, exposing all inner parts of the computer while replacing or adding a slot card.

2. The complicated mounting procedure requires professional people for disassembly. A computer may be damaged easily if the computer housing is disassembled by non-professional people.

3. A housing is generally specifically designed for one or two models and is not suitable for others.

4. Because of the enclosure type, a housing for Baby AT or Mini Tower would have to use a horizontal mounting procedure for mounting slot cards. As afore-described, a horizontal mounting procedure may damage computer component parts easily during the mounting operation and may frequently cause poor contact.

SUMMARY OF THE INVENTION

The present invention has been accomplished under the circumstances in view. It is an object of the present invention to provide a computer housing which is easy to assemble and disassemble.

Another object of the present invention is to provide a computer housing which is of an open type and suitable for mounting all types of mother boards in an easy manner.

Still another object of the present invention is to provide a computer housing which is designed for mounting all types of mother boards and slot cards through a vertical insertion procedure, in order to minimize any possible failure during assembly.

Still another object of the present invention is to provide a computer housing which can be conveniently opened for mounting slot cards without disassembly the housing or detaching any computer parts.

Still another object of the present invention is to provide a computer housing which can be conveniently opened for mounting a mother board on its side panels.

Still another object of the present invention is to provide a computer housing which can be conveniently disassembled an re-assembled by non-professional people.

A yet further object of the present invention is to provide a computer housing which has enough space available for mounting five sets of (5¼" or 3½") floppy disk drives and a 3½" hard disk.

According to the present invention, the computer housing comprises a hollow frame structure having two opposite rails at the top and a base board at the bottom, two side panels each having a plurality of T-shaped hooks projecting from its bottom edge respectively fastened in corresponding T-shaped holes on the base board, a U-shaped portion on its top edge and a plurality of mounting holes convenient for mounting mother board holders to hold mother boards by means of direction insertion, an upper cover mounted on the two rails of the frame structure with its two opposite channel edges respectively engaged with the U-shaped portions of the two side panels, and a front panel fixedly secured to the front surface of the frame structure by means of screws permitting the bevel front edge of the upper cover to be retained in an upper channel which is made on its top edge.

BRIEF DESCRIPTION OF THE DRAWINGS

The present invention will now be described by way of example, with reference to the drawings in which:

FIG. 2-1 is an enlarged view of the T-shaped hook;

DETAILED DESCRIPTION OF THE PREFERRED EMBODIMENT

Figures 1, 2:
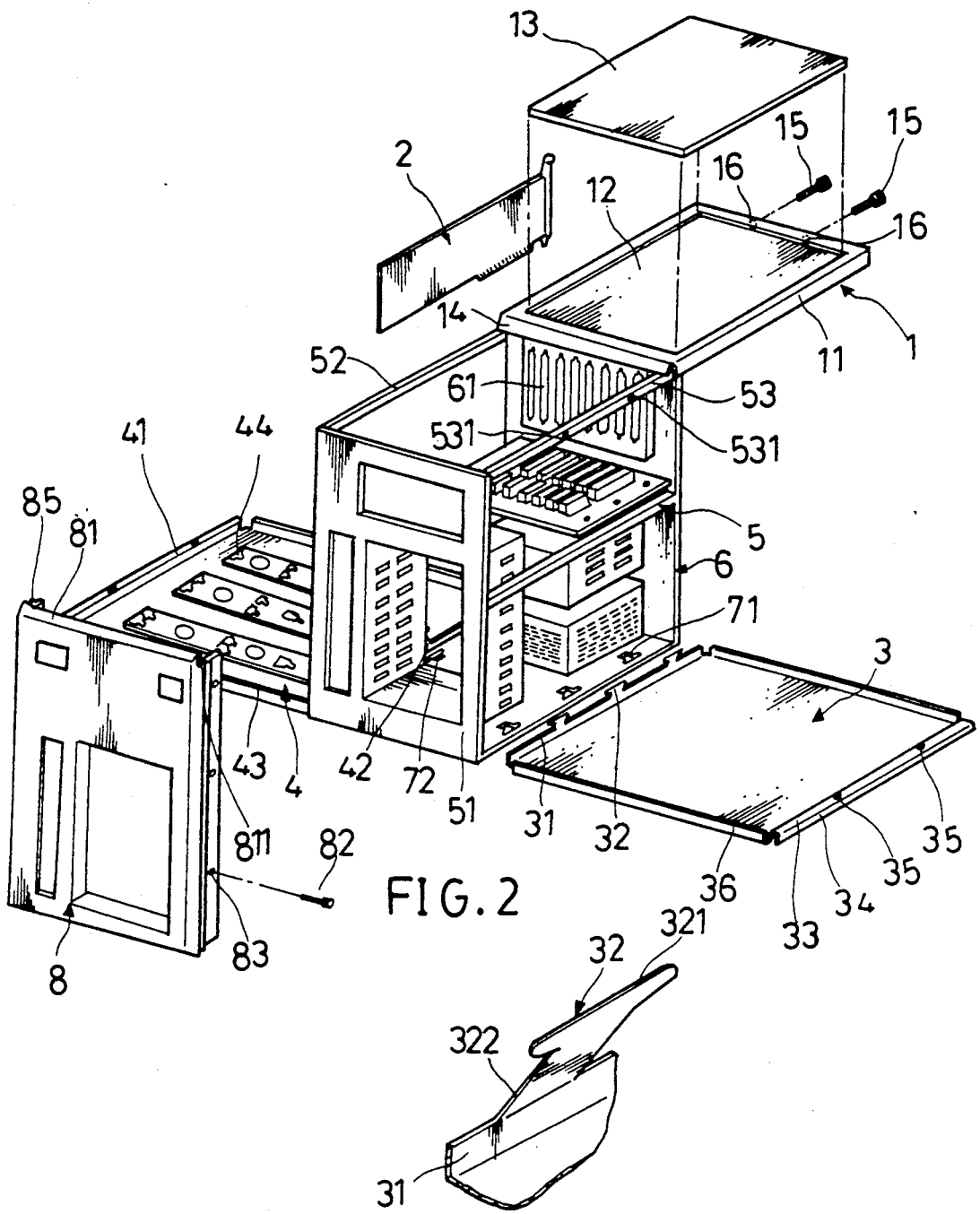
FIG. 1 is a perspective assembly view of a computer housing embodying the present invention.
FIG. 2 is a perspective fragmentary view thereof.

FIG. 1 is a perspective assembly view of a computer housing embodying the present invention. From its outer appearance, the computer housing of the present invention is similar to a regular one.

Referring to FIG. 2, the computer housing of the present invention is generally comprised of a frame structure 5 having a front panel 81 on its front board 51 and designed in such a manner that floppy disc drives can be inserted therethrough. According to a first aspect of the present invention, two side panels 3 and 4 are respectively connected to the frame structure 5 at two opposite sides, one of which has holes 44 thereon conveniently for mounting a mother board holder by non-professional people. The frame structure 5 comprises two rails 52 and 53 bilaterally at its top edge and defines therein a space for mounting hard disc drive, power supply, slot card socket . . . and etc. According to a second aspect of the present invention, each of the side panels 3 and 4 has a plurality of T-shaped hooks 32 or 42 projecting from its bottom edge and an elongated U-shaped portion 33 or 41 transversely on its top edge. There is a base board 7 (FIG. 6) having a plurality of T-shaped holes 71 at two opposite sides and designed in size and locations respectively corresponding to the T-shaped hooks 32 and 42 of the two side panels 3 and 4.

Figure 6:
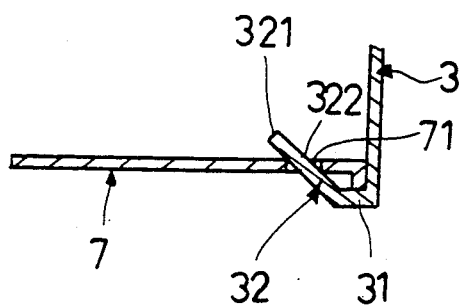
FIG. 6 is a schematic sectional view, illustrating the connection of the base board with one side panel.

Referring to FIGS. 2, 2-1 and 6, the side panel 3 has a vertical projection 31 vertically projecting from its bottom edge, the vertical projection 31 has a row of unitary, T-shaped hooks 32 obliquely extending upward therefrom, the T-shaped hooks 32 are each comprised of a connecting portion 322 and a hook portion 321. As illustrated in FIG. 6, when the hook portions 321 of the T-shaped hooks 32 are respectively inserted through the T-shaped holes 71 of the base board 7, the side panel 3 is permitted to pivot thereto.

Figure 3:
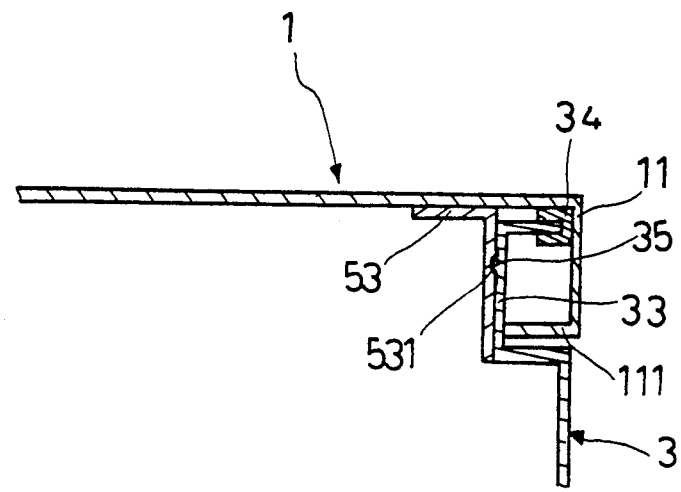
FIG. 3 is a partly sectional structural view thereof, illustrating the connection of the upper cover with one side panel.

Referring to FIGS. 2, 3 and 6, the side panel 3 has an elongated U-shaped portion 33 transversely on its top edge with a cushion 34 fastened therein, so that an upper cover 1 can be conveniently secured thereto. As illustrated in FIG. 3, the upper cover 1 comprises two channel edges 11 at two opposite sides thereof each of which has an inner projection 111. By means of inserting the inner projection 111 of the corresponding channel edge 11 in the U-shaped portion 33 with the cushion 34 stopped against the lower inner part of the channel edge 11, the upper cover 1 becomes firmly engaged with the side panel 3. Therefore, when the upper cover 1 is moved so as to slide on the two opposite rails 52 and 53 and to bilaterally fasten with the two side panels 3 and 4, no noise will be produced and no gap will be left between the upper cover 1 and the two side panels 3 and 4. The side panel 3 also comprises a plurality of raised portions 35 on its inner wall surface at top. Corresponding to the raised portions 35 of the side panel 3, an equal quantity of holes 531 are made on the corresponding rail 53 of the frame structure 5 so that the raised portions 35 can be respectively fastened in the holes 531 of the rail 53. Similar to the side panel 3, the side panel 4 has raised portions to match with an equal quantity of holes on the rail 54 for connection. The mounting of the upper cover 1 on the frame structure 5 is outlined hereinafter. After the two side panels 3 and 4 are bilaterally secured to the frame structure 5, the upper cover 1 is moved so as to slide on the two opposite rails 52 and 53 with its two opposite channel edges 11 respectively engaged with the U-shaped portions 33 and 41 of the two side panels 3 and 4.

Referring to FIG. 2 again. The upper cover 1 has a raised circumference defining therein a recessed area for mounting a rubber pad 13 by means of an adhesive. The rubber pad 13 serves as an anti-skid device so that any small objects can be stably placed thereon.

Figure 7:
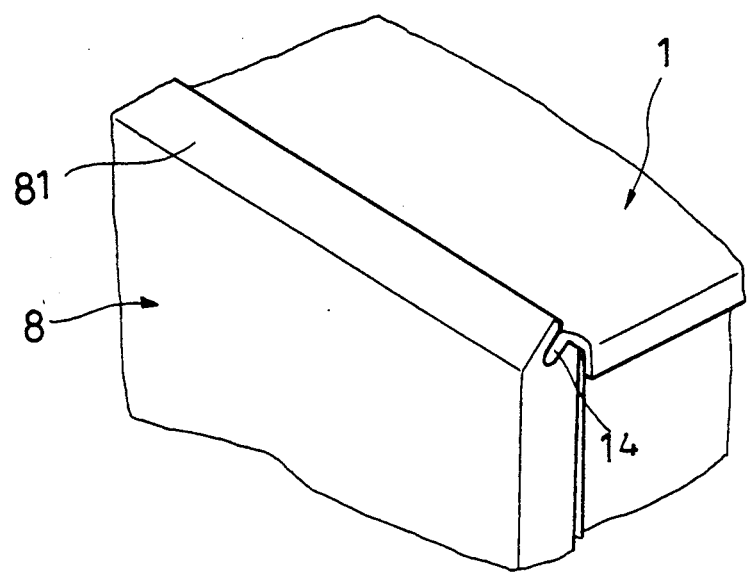
FIG. 7 is a schematic view, illustrating the connection of the front panel with the upper cover.
Figure 8:
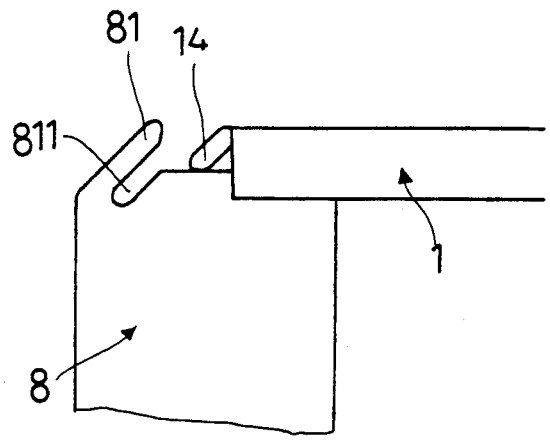
FIGS. 8 and 9 illustrate the operation to secure the upper cover to the front panel.
Figure 9:
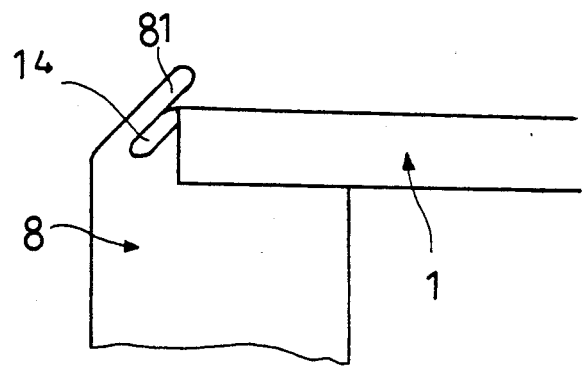

Referring to FIGS. 2, 7, 8 and g, the upper cover 1 comprises a bevel strip 14 on its front edge. When the upper cover 1 is moved along the two opposite rails 52 and 53 to the front limit, its bevel strip 14 is inserted inside an upper channel 811 which is made on the top edge 81 of the front panel 8. After the upper cover 1 is mounted on the top of the frame structure 5 and firmly engaged with the two side panels 3 and 4, it is fixedly secured to the frame structure 5 by means of screws 15 through bolt holes 16 thereon.

Figure 4:
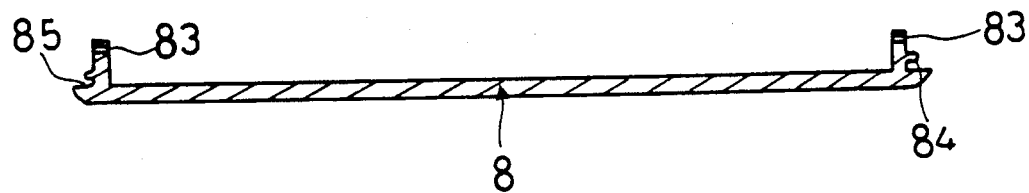
FIG. 4 is a schematic sectional view of the front panel.
Figure 5:
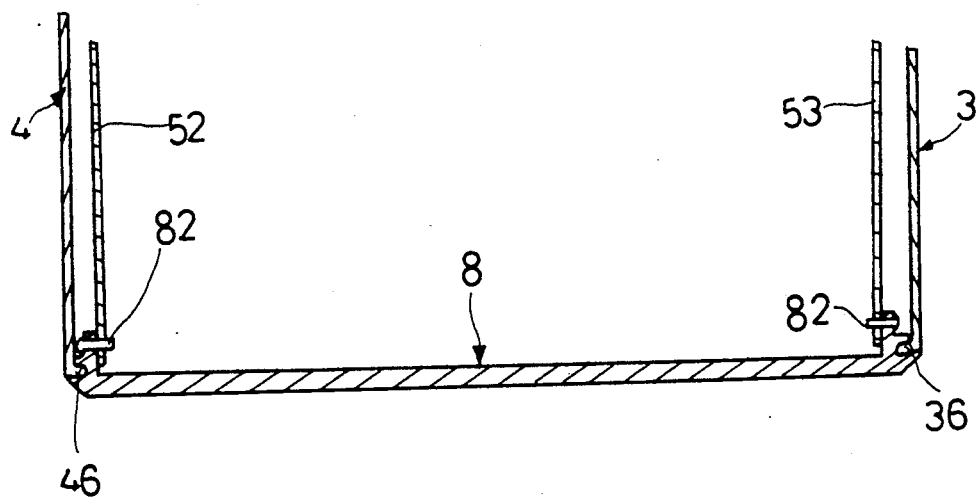
FIG. 5 is a schematic sectional view, illustrating the connection of the frame structure with the front panel and the two side panels.

Referring to FIGS. 2, 4 and 5, the front panel 8 comprises two opposite side edges having a plurality of holes 83 thereon and defining therein two vertical side channels 84 and 85. During assembly, the front panel 8 is mounted on the frame structure 5 at the front and fixedly secured thereto by means of screws 82 through the holes 83 with the vertical edges 36 and 43 of the two side panels 3 and 4 respectively engaged in the two side channels 84 and 85.

Referring to FIG. 2 again, a back panel 6 is mounted on the back side of the frame structure 5, which comprises a plurality of slots 61 for inserting slot cards 2. Corresponding to the slots 61 of the back panel 6, there are slot sockets made inside the frame structure 5 for connecting corresponding slot cards 2.

I claim:

1. A computer housing, comprising:
    a hollow frame structure defining therein an inner space for mounting electric devices, mother board, and other computer parts, and comprising two opposite rails at the top and a front board vertically at the front, said rails having each a plurality of holes on its outer side, said front board having openings for mounting floppy disc drives;
    a front panel comprising two opposite, vertical side channels and a transverse upper channel;
    an upper cover comprising two opposite channel edges respectively covering over said two opposite rails, and a bevel strip on its front end set in said upper channel;
    a base board being a flat board having a plurality of T-shaped holes at two opposite sides;
    two side panels bilaterally secured to said frame structure and having each a plurality of T-shaped hooks obliquely extending from its bottom edge, two vertical edges at its two opposite sides and an elongated U-shaped portion on its top edge, said U-shaped portion comprising a plurality of raised portions designed in size and locations corresponding to the holes on said rails and a cushion rubber firmly set therein;
    wherein said two side panels are bilaterally secured to said frame structure with the T-shaped hooks thereof respectively fastened in said T-shaped holes; said upper cover is mounted on said two opposite rails with its two channel edges respectively engaged with the U-shaped portions of said two side panels and its bevel strip fastened in said upper channel of said front panel; and said front panel is fixedly secured to said frame structure at the front by means of screws.

2. A computer housing as claimed in claim 1, wherein said side panels have holes for mounting mother board holders for holding mother boards through direction insertion.

* * * * *